July 31, 1951 K. SCHLESINGER 2,562,216

SIGNAL SEPARATION

Filed Sept. 18, 1946 2 Sheets-Sheet 1

INVENTOR
KURT SCHLESINGER
BY
Pennie, Edmonds, Morton & Barrows
ATTORNEYS

July 31, 1951 K. SCHLESINGER 2,562,216

SIGNAL SEPARATION

Filed Sept. 18, 1946 2 Sheets-Sheet 2

INVENTOR
KURT SCHLESINGER
BY
Pennie, Edmonds, Morton & Barrows
ATTORNEY

Patented July 31, 1951 2,562,216

UNITED STATES PATENT OFFICE 2,562,216

SIGNAL SEPARATION

Kurt Schlesinger, New York, N. Y., assignor to Columbia Broadcasting System, Inc., New York, N. Y., a corporation of New York Application September 18, 1946, Serial No. 697,721

21 Claims. (Cl. 178—5.4)

Figure 1:
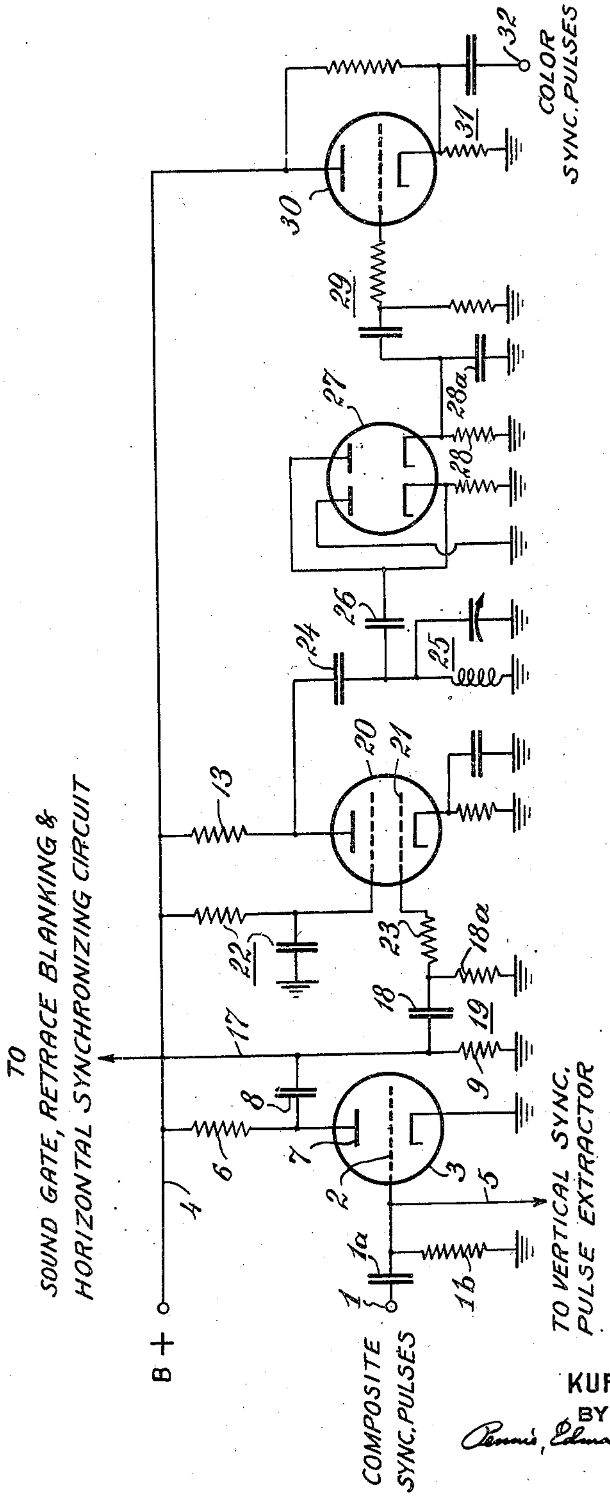

This invention relates primarily to television, particularly color television, and is especially de-designed to provide a method and apparatus for separating color synchronizing signals from other synchronizing signals in a color television signal. However, in its broader aspects the invention is more widely applicable.

For convenience of explanation, the invention will be described primarily as it is used in a color television system. The more general applications will be apparent to those in the art, but will be pointed out briefly hereinafter.

The transmission of color pictures by television has been developed through the use of combinations of signals representing the primary colors, red, green, and blue. One successful system utilizes repeated field scansions of the scene to be transmitted through a predetermined sequence of color filters, with the resultant signals reproduced at the receiving end sequentially through filters of corresponding colors. The color filters required are commonly rotated mechanically into proper position. Such filters are usually mounted in a color wheel, which may have the form of a disk, cylinder, or truncated cone, for example.

Synchronization of the line and field scanning at a television transmitter and receiver has been accomplished by a number of circuit means well known in the art. In color television it will be appreciated that it is essential, in addition, to insure that the groups of signals representing scansions in each of the primary colors, called the "color field," are properly synchronized with the movements of the color filter wheel. This synchronization must be effective not only in proper sequence and rate of change of the primary colors, but also in phase so that a reproduced field representing the red aspect of a scene will be reproduced through a red filter, etc.

Field synchronizing signals have been employed for synchronizing the color filter wheel at a receiver with that at the transmitter. With such synchronization a reproduced field corresponding to one color aspect of a scene, say red, may be reproduced through a green or blue filter, so that provision is made for the operator to change the phase of the color wheel at the receiver until red aspects are exhibited through red filters, green aspects through green filters, etc. This may be termed "color phasing."

It is advantageous to effect the color phasing automatically. It has therefore been suggested to transmit distinctive color synchronizing signals for this purpose. Such color synchronizing signals may be used by themselves to effect synchronization, or may be used in conjunction with field synchronizing signals.

Examples of various types of synchronization are contained in U. S. Patents Nos. 2,329,194 and 2,323,905 to Goldmark, and 2,319,789 to Chambers.

While theoretically many different types of distinctive color synchronizing signals are possible, in practice it is advantageous to employ as simple signals as possible and to avoid increasing the band width of the over-all television signal. Commonly, line synchronization is accomplished by single pulses transmitted between successive line scansions, and field synchronization is accomplished by a group of alternate short and long pulses transmitted between successive field scansions. It has been proposed to employ a group of short pulses as a color synchronizing signal. For a three-color system such a group of short pulses would be transmitted during the blanking interval after every third field, thus always being associated with the same color field. Such a color synchronizing signal presents the problem of separating it from the field synchronizing signal. The harmonic content of the color synchronizing signal may not be sufficiently different from that of the field synchronizing signal to enable separation by frequency discrimination with sufficient reliability. It will, of course, be realized that reliability of color synchronization, and hence the reliability of the separation of color and field synchronizing signals, is of great importance in a practical color television system.

It is a particular object of the present invention to provide a method and apparatus which permits the reliable separation of the color synchronizing signal so that correct color synchronization is obtained.

While not confined thereto, for convenience the invention will be described in connection with a multiplex type of transmission, in which the video, sound, and line, field, and color synchronizing signals are transmitted on the same carrier and separated at the receiver by suitable circuit means.

The field synchronizing signals can be separated from the line synchronizing signals by applying them to an integrating circuit, from which responses of different strengths are obtained due to the different amplitude response to pulses of differing duration. Amplitude separation may then be successfully used to obtain field synchronizing pulses. It is difficult, however, to secure reliable operation if the separation of color from field synchronizing signals is attempted by the same means.

In accordance with the present invention, instead of separating the color synchronizing signal from the field synchronizing signal by direct integration, or by direct frequency discrimination, the signals are first applied to a differentiating circuit which differentiates the component pulses of the signals to obtain short differentiated pulses of opposite polarity from leading and trailing edges thereof. Differentiated pulses of one polarity are then selected to the substantial exclusion of pulses of opposite polarity, for example, by a rectifier or clipping circuit. With appropriate periodicity and durations of the component pulses of the color and field synchronizing signals, different responses may then be obtained from the selected differentiated pulses corresponding to color and field signals. In the particular embodiment described hereinafter, separation is accomplished with the aid of a frequency discriminating circuit, since the harmonic content of the selected differentiated pulses of the two signals are sufficiently different.

Figure 2:
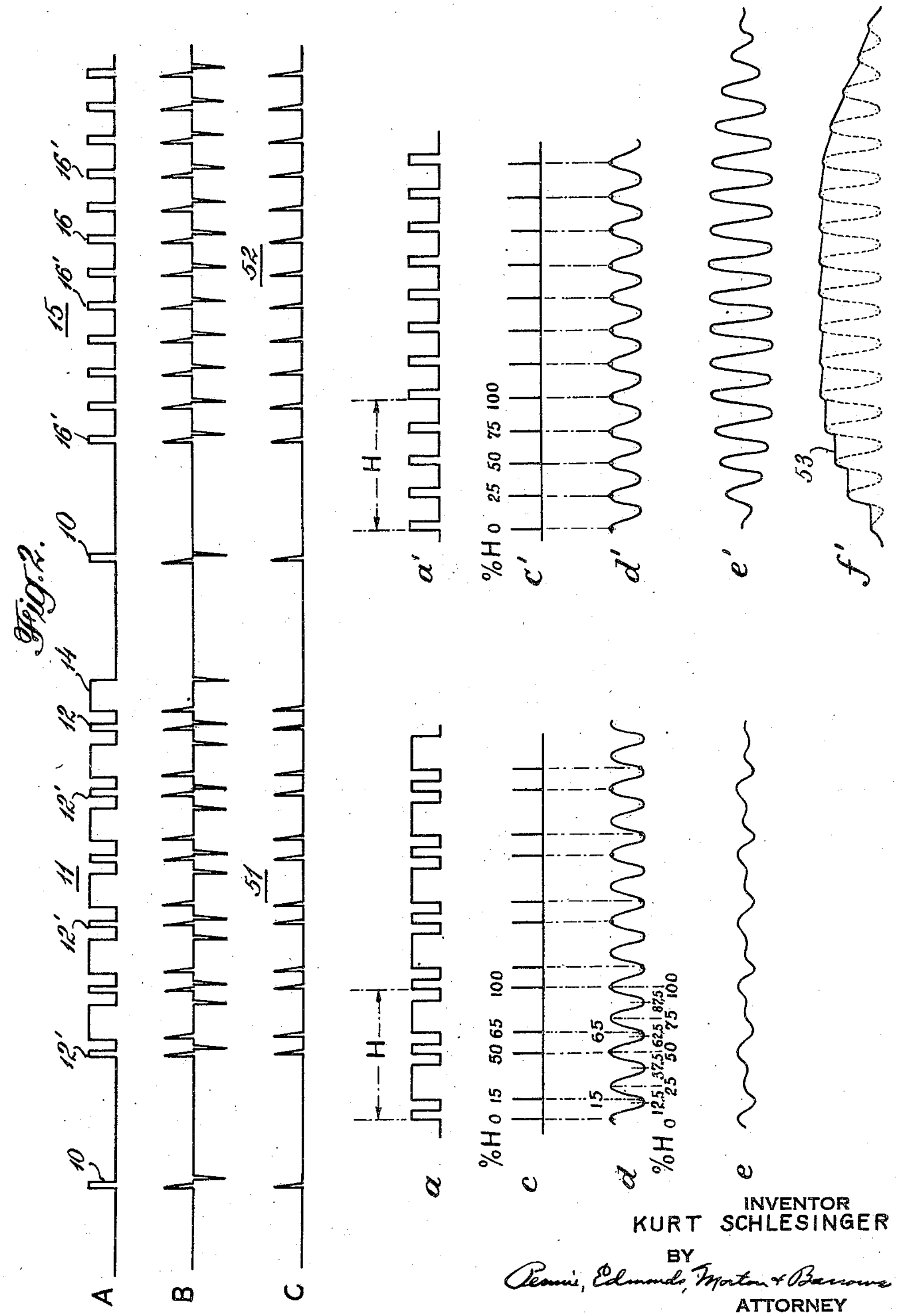

The invention will be more fully understood by the following detailed description taken in conjunction with the drawings, in which:

Fig. 1 is a circuit diagram illustrating the invention as incorporated in a color television receiver; and Fig. 2 illustrates diagrammatically the wave forms present during operation in different parts of the circuit of Fig. 1.

Referring now to the drawings for a more detailed explanation of the invention, a portion of the synchronizing circuits including the color synchronizing signal separation arrangement is shown in Fig. 1. Here composite synchronizing signals are applied through a lead 1, coupling capacitor 1*a*, and grid resistor 1*b* to the control grid 2 of an electronic tube 3, here shown as a triode, receiving its anode potential from a common B+ source 4. The applied composite synchronizing signals may be positive or negative but will here be assumed to be negative.

In the figures, conventional heater-type vacuum tubes have been shown, and the heater windings and power supply omitted from the drawings for the sake of clarity. The use of a common source of anode potential has also been shown conventionally.

All synchronizing signal components of the complete composite television signal may be present at the grid 2. The video is assumed to have been extracted in previous circuit means forming no part of the present invention.

A lead 5 is provided through which the negative composite signal is also carried to a circuit, not shown, arranged to extract the vertical synchronizing pulses. This vertical pulse extraction circuit forms no part of the present invention.

Tube 3 acts as an inverter and clipper for the composite synchronizing pulses. As shown, it is connected as a grounded load amplifier utilizing a relatively large plate resistor 6 as a D. C. feeder to supply voltage to the tube anode 7. The output of tube 3 is therefore a positive composite synchronizing signal across the output A.-C. load resistor 9, which may be relatively small. Coupling capacitor 8 is advantageously large, and may be electrolytic if desired, so that the time constant with resistors 6 and 9 is larger than the longest pulses to be amplified. Other types of amplifiers may be employed if desired, the grounded load type being helpful to reduce distortion.

A portion of the wave form of the positive composite synchronizing signal at this point has been illustrated schematically in Fig. 2 at A, together with subsequent wave form developments in the circuit which will be explained hereafter. Shown are the horizontal synchronizing signal pulses 10, the vertical synchronizing signal pulse group 11, made up of twelve alternating short portions 12 and long portions 14, and the color synchronizing signal pulse group 15, comprising a series of twelve short pulses 16. It will be understood that a line synchronizing pulse 10 recurs after each line scansion, a vertical or field synchronizing pulse group 11 after each field scansion, and a color synchronizing pulse group 15 after each third field in a three-color sequential system where successive fields are in different colors.

With the assumed multiplex sound and video signal, sound is transmitted in bursts during the line blanking intervals immediately following the line synchronizing pulses. Inasmuch as the sound bursts must continue to be transmitted during the field blanking intervals, the field and color synchronizing signals contain pulses 12′ and 16′ which have the same spacing as the line synchronizing pulses 10. Thus the sound gate at the receiver can be maintained in accurate synchronism at all times to provide accurate separation of sound and video.

In a specific system which has been operated successfully, the line scanning frequency was 31.5 kc., giving a pulse repetition frequency (PRF) of 31.5 kc. for the line synchronizing signal. The narrow and broad pulses in a single burst of the vertical or field synchronizing signal each had a PRF twice the line synchronizing frequency, or 63 kc., giving an over-all PRF of 126 kc. The field frequency was 120 fields per second, so that the bursts of field synchronizing pulses recurred at 120 bursts per second. The color synchronizing pulses in a single burst had a PRF of 126 kc., and the bursts recurred each third field or 40 per second. With different operating standards these figures would of course be changed.

Since the field synchronizing pulses have an over-all PRF of 126 kc., albeit with alternate long and short pulses, there is a considerable 126 kc. component. This renders difficult the separation from the 126 kc. color synchronizing pulses by direct frequency separation.

Returning to the circuit of Fig. 1, the positive composite signal with the form shown in Fig. 2 at A is carried through a lead 17 to sound gate, retrace blanking, and horizontal synchronizing circuits with which this application is not concerned.

The composite signal is also fed to a differentiating circuit 19, including capacitor 18 and resistor 18*a*, and the output applied to tube 20 through a grid resistor 23. The values of the elements of network 19 are so chosen that it has a very short time constant, and its output will comprise a differential wave having positive and negative differentiated pulses corresponding to leading and trailing edges of the component pulses in the applied signal waves. This output is applied to the control grid 21 of a tube 20, shown as a tetrode, which is biased beyond cutoff and functions as a plate rectifier, drawing plate potential from the common B+ source 4. A conventional arrangement, indicated generally as 22, provides screen grid potential. Current flows through tube 20, therefore, only during the application of positive differentiated pulses, representing leading edges of the applied component pulses.

In Fig. 2 at B is show the form of the differential wave appearing at the output of the differentiating circuit 19, and the resultant flow of anode current in tube 20 under the influence of the positive differentiated pulses is illustrated at C. Differentiated pulse group 51 now represents the field synchronizing signal and group 52 the color synchronizing signal.

It will be observed that the relative time relationship of the pulses in group 51, corresponding to the leading edges of the field synchronizing signal 11, is different from that of the pulses in group 52, corresponding to the leading edges of the color synchronizing signal 16. This difference permits obtaining different responses for the two groups 51, 52 of selected differentiated pulses.

The anode circuit of tube 20 contains a tuned network, indicated generally as 25, fed through coupling capacitor 24.

Network 25 is a resonant circuit tuned to yield different output responses for the pulse groups 51 and 52. It will be observed that the pulses of group 51 are unevenly spaced, whereas those of group 52 are evenly spaced. Hence tuning to the fundamental frequency of the pulses of group 52 has been employed with success. Assuming pulses of 126 kc., for example, currents of this frequency will be able to build up to substantial amplitudes, and others will be discouraged. The separation of the color pulses from the vertical pulses will be seen by referring again to Fig. 2.

The vertical and color pulse components have been shown separately from the rest of the synchorinizing signals at $a$ and $a'$, respectively, with the corresponding leading edge differentiated pulses from tube 20 alined therebeneath at $c$ and $c'$. As a specific illustration, the time at which each differentiated pulse occurs has been indicated as a percentage of the horizontal line period H. The beginning of each long pulse component of the vertical synchronizing signal is shown as occurring at 15% H or 65% H after the beginning of the initial short pulse component. Under $c$ and $c'$ have been shown in proper registry at $d$ and $d'$ the form of the ideal 126 kc. sine wave currents to which the network 25 is assumed tuned.

It will be apparent by comparing $c$ and $d$ of Fig. 2 that every alternate pulse through tube 20 produced by the vertical synchronizing signals will be substantially out of phase with the ideal sine wave, the corresponding negative peaks of which would occur at 12.5% H, 62.5% H, and so on. Hence it will be seen that current flow in network 25 will be discouraged from building up in amplitude when the vertical pulses are received as illustrated at $e$.

On the other hand, comparison of $c'$ and $d'$ will make it apparent that pulses through tube 20 due to the color synchronizing signal will be in phase with the ideal 126 kc. sine waves, and so oscillatory currents will build up through tuned circuit 25 to substantial amplitudes, as seen at $e'$. In practice a ratio of 3 to 1 or better has been obtained between the amplitudes shown at $e'$ due to the color pulses, and those shown at $e$ due to the field pulses.

The output of the tuned circuit 25 is applied through a coupling capacitance 26 to a rectifier 27. Rectifier 27 is shown as a double diode so connected that its output is proportional to the peak to peak voltage across the tuned circuit 25. The output appears across the resistor 28 and shunt capacitor 28$a$. Capacitor 28$a$ is charged through the diode 27 to nearly the peak to peak voltage of the input wave $e'$. Shunting resistor 28 provides a discharge path for capacitor 28$a$ and the time constant is advantageously selected to smooth the rectified output of diode 27, but allow sufficiently quick decay at the end of each pulse group. Fig. 2 at $f'$ illustrates the peak-to-peak rectification of wave $e'$ in dotted lines, and the smoothed output wave across capacitor 28$a$ at 53. Thus the group of pulses 15 forming the color synchronizing signal is converted to a single pulse 53. A similar smoothed wave is formed from wave $e$ for the field synchronizing signal, but of much smaller amplitude than wave 53.

The smoothed output of rectifier 27 is then applied through a coupling circuit, indicated generally as 29, to a tube 30, here shown as a triode, biased to act as a clipper between the amplitude levels due to the two types of signals. The response due to the color pulses only will be permitted to pass through tube 30 and cathode coupling circuit 31 to the output terminal 32. The response due to the field synchronizing pulses will be eliminated by the clipping action. Suitable means, not shown in the figures, may then be utilized for the synchronizing of the rotation of the color filter by means of the color synchronizing pulses.

Returning to the tuned circuit 25, it may be seen that it is not essential to have low loss circuit elements. Theoretical considerations show that a certain optimum Q-factor will produce the maximum difference of response to two groups of pulses of different wave form and of limited duration. In the practical application of this circuit, optimum damping of the resonant circuit may be obtained by adjusting plate resistor 13. If desired, a resistor shunting the resonant circuit 25 could be employed for damping.

Resonant circuit 25 has been described specifically as tuned to the repetition frequency of the selected differentiated pulses shown in Fig. 2 at $c'$. It may be desirable in many cases to tune the circuit to other frequencies, particularly higher harmonics than the fundamental, the term "harmonic" being used to include the fundamental. The choice depends on the relative time relationships of the selected differentiated pulses of the signals to be separated. In any specific instance, the appropriate frequency which will give best discrimination between two applied signals may readily be determined. The Fourier analysis of the signals to be separated is a helpful guide in the selection of the best frequency to employ.

It is also apparent that in the circuit of Fig. 1 differentiated pulses corresponding to the line synchronizing signal will also be applied to the tuned circuit 25. With the assumed 31.5 kc. line frequency and 126 kc. for the tuned circuit, the circuit is tuned to the fourth harmonic of the line frequency. The Fourier analysis of the differentiated pulses corresponding to the line synchronizing signal may be taken into account along with the analyses of the field and color differentiated pulses in determining the best frequency for the tuned circuit. For example, in specific cases, tuning to the second or third harmonics of the color synchronizing pulses has been found advantageous.

As shown in Fig. 2 at C, the selected differentiated pulses of the color synchronizing signal, group 52, are evenly spaced. Generally speaking, this is not necessary, as long as the time relationships of the pulses are sufficiently different from the other signal or signals to be separated.

Also, the positive differentiated pulses of Fig. 2B were selected in the rectifier or clipping stage 20. As is apparent from Fig. 2B, the negative differentiated pulses of the field signal have a relative time relationship similar to the positive differentiated pulses. The same is true of the color signal. Hence the negative pulses could have been selected, if desired, and appropriate means employed to obtain different responses from the two series of pulses. Such similarity between positive and negative differentiated pulses of a given signal may not always exist, since it depends on the periodicity and length of the pulses in the signal which is differentiated. Generally speaking, either the leading or trailing pulse edges of one wave should have a relative time relationship different from corresponding pulse edges of the other. If, for example, the leading edges of two signals had similar time relationships and the trailing edges different, the differentiated pulses corresponding to the trailing edges should be selected. This is easily accomplished by selecting the proper polarity of differentiated pulses. If both leading and trailing edges of two signals have different time relationships, it is usually advantageous to select the polarity of differentiated pulses which will yield the greatest difference between the signals to be separated, so as to facilitate the production of different responses therefrom.

The foregoing disclosure describes the invention as applied to the separation of color synchronizing signals from field synchronizing signals in a color television system, for which the invention is particularly adapted. While especially useful at the receiver, it may also be employed at the transmitter end.

In its broader aspects the invention may be applied generally to the production of different responses from different signal waves in a composite signal, particularly pulse signal waves in which the leading or trailing pulse edges of one wave have a relative time relationship different from corresponding pulse edges of another. The invention is especially useful in connection with pulse signal waves which, while bearing the time relationship just mentioned, have frequency and amplitude characteristics, or harmonic contents, sufficiently similar to render separation by frequency discrimination difficult.

It will be apparent to those in the art that many different circuit arrangements may be employed within the scope of the invention, and modifications made to fit the specific requirements.

I claim:

1. In a television system for receiving a composite signal including a plurality of synchronizing signal waves of different pulse characteristics, apparatus for producing different responses from said synchronizing signal waves which comprises means for differentiating the pulses of said synchronizing signal waves to obtain short differentiated pulses of opposite polarity from leading and trailing edges thereof, means for rectifying the differentiated signal waves to select differentiated pulses of one polarity to the substantial exclusion of pulses of opposite polarity, and filter means for producing different responses from the rectified waves.

2. In a television system for receiving a composite television signal including a plurality of synchronizing signal waves of different pulse characteristics, apparatus for producing different responses from said synchronizing signal waves which comprises a differentiating circuit for differentiating the pulses of said synchronizing signal waves to obtain short differentiated pulses of opposite polarity from leading and trailing edges thereof, a rectifying circuit for rectifying the differentiated signal waves to select differentiated pulses of one polarity to the substantial exclusion of pulses of opposite polarity, discriminating means for producing different responses from the rectified waves corresponding to different signal waves, and means for separating the different responses.

3. In a television system for receiving a composite television signal including a plurality of synchronizing signal waves of different pulse characteristics, apparatus for producing a response from one synchronizing signal wave separate from another which comprises a differentiating circuit for differentiating the pulses of said synchronizing signal waves to obtain short differentiated pulses of opposite polarity from leading and trailing edges thereof, a rectifying circuit for rectifying the differentiated signal waves to select differentiated pulses of one polarity to the substantial exclusion of pulses of opposite polarity, a discriminating circuit for producing different responses from the rectified waves corresponding to different signal waves, a rectifying circuit for producing rectified responses from said different responses, and a clipping circuit supplied with said rectified responses to separate at least one rectified response from another.

4. In a television system for receiving a composite television signal including a plurality of synchronizing signal waves of different pulse characteristics, apparatus for producing different responses from said synchronizing signal waves which comprises a differentiating circuit, means for supplying said plurality of synchronizing signal waves to said differentiating circuit to thereby obtain short differentiated pulses of opposite polarity from leading and trailing edges of the component pulses thereof, means for selecting differentiated pulses of one polarity to the substantial exclusion of pulses of opposite polarity, and a discriminating circuit supplied with the selected pulses for yielding different outputs for selected pulses corresponding to one synchronizing signal wave and selected pulses of another.

5. In a television system for receiving a composite television signal including a plurality of synchronizing pulse signal waves, the leading or trailing pulse edges of one wave having a relative time relationship different from corresponding pulse edges of another, apparatus for producing different responses from said synchronizing signal waves which comprises a differentiating circuit, means for supplying said plurality of synchronizing signal waves to said differentiating circuit to thereby obtain short differentiated pulses of opposite polarity from leading and trailing edges of the component pulses thereof, means for selecting differentiated pulses of one polarity corresponding to pulse edges bearing said different time relationships to the substantial exclusion of differentiated pulses of opposite polarity, and a frequency responsive circuit supplied with the selected differentiated pulses and tuned to discriminate between selected pulses corresponding to one synchronizing signal wave and selected pulses of another.

6. In a television system for receiving a comsynchronizing signals recurring between successive field scansions and pulsed color synchronizing signals recurring sequentially between predetermined field scansions, apparatus for producing a separate color synchronizing response which comprises a differentiating circuit, means for supplying said plurality of synchronizing signals to said differentiating circuit to obtain short differentiated pulses of opposite polarity from leading and trailing edges of the component pulses thereof, a rectifier for selecting one polarity of differentiated pulses to the substantial exclusion of differentiated pulses of opposite polarity, a resonant circuit supplied with the selected differentiated pulses and tuned to discriminate between selected pulses corresponding to the color synchronizing signal and selected pulses of the other, a rectifying and smoothing circuit supplied from the output of said resonant circuit to obtain different amplitude smoothed signals corresponding to the color and field synchronizing signals, and a clipping circuit supplied from said rectifying and smoothing circuit and adapted to pass the smoothed signal corresponding to the color synchronizing signal and substantially eliminate the other.

13. In a color television system for receiving a color television signal including field synchronizing signals of alternate short and long pulses recurring between successive field scansions and color synchronizing signals of short pulses of substantially the same pulse recurrence frequency recurring sequentially between predetermined field scansions, apparatus for producing a separate color synchronizing response which comprises a differentiating circuit, means for supplying said field and color synchronizing signals to said differentiating circuit to obtain short differentiated pulses of opposite polarity from leading and trailing edges of the component pulses thereof, means for selecting differentiated pulses of one polarity to the substantial exclusion of differentiated pulses of opposite polarity, a resonant circuit supplied with the selected differentiated pulses and tuned to discriminate between pulses corresponding to the color synchronizing signal and pulses corresponding to the field synchronizing signal, means supplied with the output of the resonant circuit for producing smoothed responses of different magnitude corresponding to color and field synchronizing signals, and means for separating the smoothed response corresponding to the color synchronizing signal from the response corresponding to the field synchronizing signal.

14. In a color television system for receiving a color television signal including field synchronizing signals of alternate short and long pulses recurring between successive field scansions and color synchronizing signals of short pulses of substantially the same pulse recurrence frequency recurring sequentially between predetermined field scansions, apparatus for producing a separate color synchronizing response which comprises a differentiating circuit, means for supplying said field and color synchronizing signals to said differentiating circuit to obtain short differentiated pulses of opposite polarity from leading and trailing edges of the component pulses thereof, a rectifier for selecting differentiated pulses of one polarity to the substantial exclusion of differentiated pulses of opposite polarity, a resonant circuit supplied with the selected differentiated pulses and tuned to discriminate between pulses corresponding to the color synchronizing signal and pulses corresponding to the field synchronizing signal, a peak-to-peak rectifier and smoothing circuit supplied from the output of the resonant circuit to obtain different amplitude smoothed responses corresponding to said color and field synchronizing signals, and a clipping circuit supplied from said rectifier and smoothing circuit adapted to pass the smoothed response corresponding to the color synchronizing signal and substantially eliminate the other.

15. In a system for receiving a composite signal including a plurality of pulse signal waves of different pulse characteristics, apparatus for producing different responses from said pulse signal waves which comprises a differentiating circuit for differentiating said pulse signal waves to obtain short differentiated pulses of opposite polarity from leading and trailing edges of the component pulses thereof, a rectifying circuit for rectifying the differentiated pulse signal waves to select differentiated pulses of one polarity to the substantial exclusion of pulses of opposite polarity, and a discriminating circuit for producing different responses from the rectified waves.

16. In a system for receiving a composite signal including a plurality of pulse signal waves of different pulse characteristics, apparatus for producing different responses from said pulse signal waves which comprises a differentiating circuit for differentiating said pulse signal waves to obtain short differentiated pulses of opposite polarity from leading and trailing edges of the component pulses thereof, a rectifying circuit for rectifying the differentiated pulse signal waves to select differentiated pulses of one polarity to the substantial exclusion of pulses of opposite polarity, a frequency discriminating circuit for producing different amplitude responses from the rectified waves, and an amplitude selective circuit for separating the different responses.

17. In a system for receiving a composite signal including a plurality of pulse signal waves, the leading or trailing edges of the component pulses of different signal waves bearing different time relationships, apparatus for producing different responses from said signal waves which comprises a differentiating circuit, means for supplying said plurality of pulse signal waves to said differentiating circuit to obtain short differentiated pulses of opposite polarity from leading and trailing edges of the component pulses thereof, a rectifying circuit or selecting one polarity of differentiated pulses corresponding to pulse edges bearing said different time relationships to the substantial exclusion of differentiated pulses of opposite polarity, and a filter circuit supplied with the selected differentiated pulses and tuned to discriminate between selected pulses corresponding to one signal wave and selected pulses of another.

18. In a system for receiving a composite signal including a plurality of sequentially occurring pulse signal waves, the leading or trailing edges of the component pulses of one signal wave having a relative time relationship different from corresponding edges of another signal wave, apparatus for producing different responses from said signal waves which comprises a differentiating circuit, means for supplying said plurality of pulse signal waves to said differentiating circuit to obtain short differentiated pulses of opposite polarity from leading and trailing edges of the component pulses thereof, a rectifying circuit for selecting one polarity of differentiated pulses corresponding to pulse edges bearing said differposite television signal including a plurality of synchronizing pulse signal waves, the leading or trailing pulse edges of one signal wave having a relative time relationship different from corresponding pulse edges of another, apparatus for producing different responses from said synchronizing signal waves which comprises a differentiating circuit, means for supplying said plurality of synchronizing signal waves to said differentiating circuit to thereby obtain short differentiated pulses of opposite polarity from leading and trailing edges of the component pulses thereof, a rectifying circuit for selecting differentiated pulses of one polarity corresponding to pulse edges bearing said different time relationships to the substantial exclusion of differentiated pulses of opposite polarity, a frequency responsive circuit supplied with the selected differentiated pulses and tuned to discriminate between selected pulses corresponding to one synchronizing signal wave and selected pulses of another, a rectifying circuit for producing rectified signals from the output of said frequency responsive circuit, and an amplitude selective circuit for separating the rectified signal corresponding to one synchronizing signal wave from another.

7. In a television system for receiving a composite television signal including a plurality of sequentially occurring synchronizing pulse signal waves, the leading or trailing pulse edges of one signal wave having a relative time relationship different from corresponding pulse edges of another, apparatus for producing different responses from said signal waves which comprises a differentiating circuit, means for supplying said plurality of synchronizing signal waves to said differentiating circuit to thereby obtain short differentiated pulses of opposite polarity from leading and trailing edges of the component pulses thereof, a rectifier for selecting one polarity of differentiated pulses corresponding to pulse edges bearing said different time relationships to the substantial exclusion of differentiated pulses of opposite polarity, a resonant circuit supplied with the selected differentiated pulses and tuned to discriminate between selected pulses corresponding to one synchronizing signal wave and selected pulses of another, a rectifying circuit for rectifying the output of said resonant circuit to obtain different amplitude responses corresponding to said one and said other synchronizing signal waves, and an amplitude selective circuit for separating said different responses in accordance with their amplitudes to obtain a response corresponding to one synchronizing signal wave with the substantial elimination of said other.

8. In a color television system for receiving a color television signal including pulsed field synchronizing signals and pulsed color synchronizing signals, apparatus for producing different responses from said synchronizing signals which comprises a differentiating circuit, means for supplying said field and color synchronizing signals to said differentiating circuit to thereby obtain short differentiated pulses of opposite polarity from leading and trailing edges of the component pulses thereof, means for selecting differentiated pulses of one polarity to the substantial exclusion of differentiated pulses of opposite polarity, and a discriminating circuit supplied with the selected differentiated pulses for yielding different outputs for selected pulses corresponding to the color and field synchronizing signals.

9. In a color television system for receiving a color television signal including pulsed field synchronizing signals and pulsed color synchronizing signals, apparatus for producing different responses from said synchronizing signals which comprises a differentiating circuit, means for supplying said field and color synchronizing signals to said differentiating circuit to thereby obtain short differentiated pulses of opposite polarity from leading and trailing edges of the component pulses thereof, a rectifying circuit for selecting differentiated pulses of one polarity to the substantial exclusion of differentiated pulses of opposite polarity, a frequency responsive circuit supplied with the selected differentiated pulses and tuned to discriminate between selected pulses corresponding to one synchronizing signal and selected pulses of the other, and means supplied with the output of said frequency responsive circuit for producing a synchronizing response corresponding to said one synchronizing signal to the substantial exclusion of said other.

10. In a color television system for receiving a composite color television signal including pulsed field and color synchronizing signals, the leading or trailing pulse edges of one signal having a relative time relationship different from corresponding pulse edges of the other, apparatus for producing different responses from said synchronizing signals which comprises a differentiating circuit, means for supplying said field and color synchronizing signals to said differentiating circuit to obtain short differentiated pulses of opposite polarity from leading and trailing edges of the component pulses thereof, a rectifier for selecting differentiated pulses of one polarity corresponding to pulse edges bearing said different time relationships to the substantial exclusion of differentiated pulses of opposite polarity, a filter circuit supplied with the selected differentiated pulses and tuned to discriminate between selected pulses corresponding to one synchronizing signal and selected pulses of the other, a rectifier circuit supplied from the output of said filter circuit, and a clipping circuit supplied from said rectifier circuit and adapted to pass the rectified output corresponding to said one synchronizing signal and substantially eliminate the rectified output corresponding to said other.

11. In a color television system for receiving a color television signal including pulsed field synchronizing signals recurring between successive field scansions and pulsed color synchronizing signals recurring sequentially between predetermined field scansions, apparatus for producing a separate color synchronizing response which comprises a differentiating circuit, means for supplying said field and color synchronizing signals to said differentiating circuit to thereby obtain short differentiated pulses of opposite polarity from leading and trailing edges of the component pulses thereof, a rectifying circuit for selecting differentiated pulses of one polarity to the substantial exclusion of differentiated pulses of opposite polarity, a tuned circuit supplied with the selected differentiated pulses for discriminating between selected pulses corresponding to the color synchronizing signal and selected pulses of the field synchronizing signal, and an amplitude selective circuit supplied with the output of said tuned circuit for producing a synchronizing response corresponding to the color synchronizing signal to the substantial exclusion of the response of the field synchronizing signal.

12. In a color television system for receiving a color television signal including pulsed field ent time relationships to the substantial exclusion of differentiated pulses of opposite polarity, a resonant circuit supplied with the selected differentiated pulses and tuned to discriminate between selected pulses corresponding to one signal wave and selected pulses of another, a rectifying circuit for rectifying the output of said resonant circuit to obtain different amplitude responses corresponding to said one and said other signal waves, and an amplitude selective circuit for separating said different responses in accordance with their amplitudes to obtain a response corresponding to one signal with the substantial elimination of another.

19. In a television system, the method of producing different responses from a plurality of pulse synchronizing signals in a composite signal which comprises differentiating said pulse synchronizing signals to obtain short differentiated pulses of opposite polarity from leading and trailing edges of the component pulses thereof, rectifying the differentiated signals to select differentiated pulses of one polarity to the substantial exclusion of pulses of opposite polarity, and filtering the rectified signals to produce different responses corresponding to different synchronizing signals.

20. In a color television system having pulsed field and color synchronizing signals in a composite color television signal, the method of producing different responses for said synchronizing signals which comprises differentiating said synchronizing signals to produce short differentiated pulses of opposite polarity from leading and trailing edges of the component pulses thereof, selecting differentiated pulses of one polarity to the substantial exclusion of pulses of opposite polarity, and filtering the selected differentiated pulses to produce different responses corresponding to color and field synchronizing signals.

21. In a color television system having pulsed field and color synchronizing signals in a composite color television signal, the method of producing different responses for said synchronizing signals which comprises differentiating said synchronizing signals to produce short differentiated pulses of opposite polarity from leading and trailing edges of the component pulses thereof, rectifying the differentiated signals to select differentiated pulses of one polarity to the substantial exclusion of pulses of opposite polarity, filtering the selected differentiated pulses to produce different magnitude outputs corresponding to color and field synchronizing signals, and separating said outputs in accordance with their magnitudes to yield a seperate synchronizing response for one of said synchronizing signals.

KURT SCHLESINGER.

REFERENCES CITED

The following references are of record in the file of this patent:

UNITED STATES PATENTS

| Number | Name | Date |
|---|---|---|
| 2,198,969 | Lewis | Apr. 30, 1940 |
| 2,229,964 | Dome | Jan. 28, 1941 |
| 2,319,789 | Chambers | May 25, 1943 |

FOREIGN PATENTS

| Number | Country | Date |
|---|---|---|
| 524,286 | Great Britain | Aug. 2, 1940 |
| 555,492 | Great Britain | Aug. 25, 1943 |